Jan. 27, 1925.
J. SACHS
1,524,153
METER PROTECTIVE DEVICE
Original Filed Jan. 12, 1918
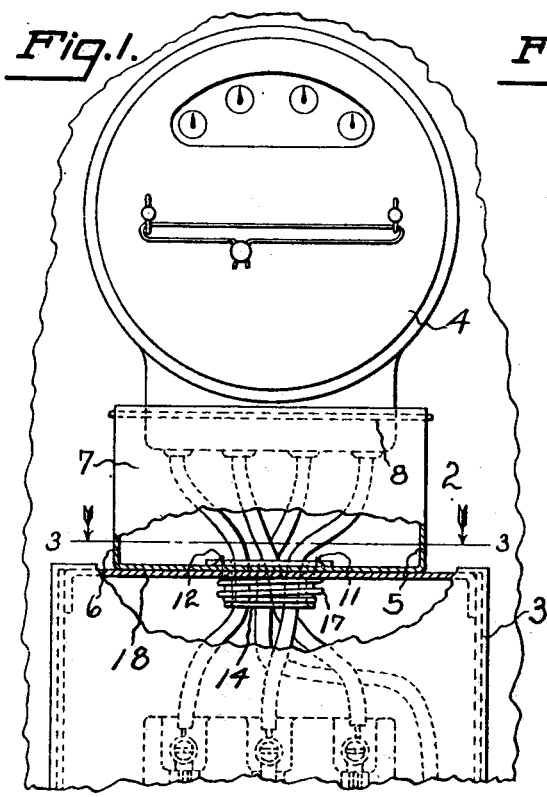
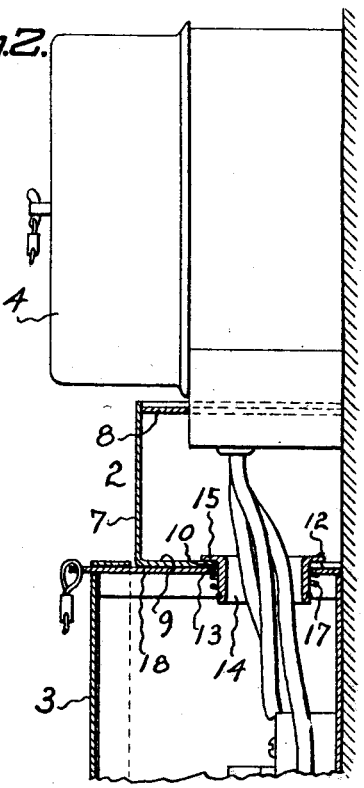
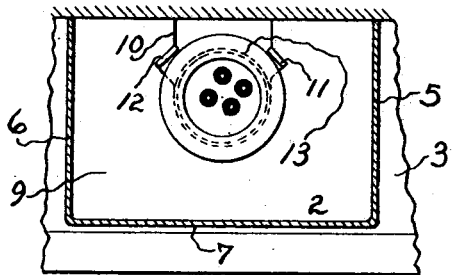
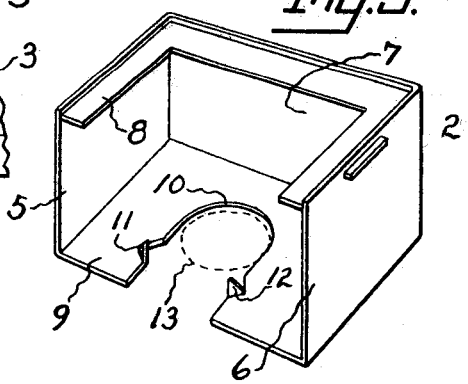
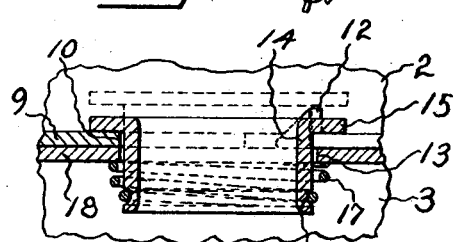
Inventor
Joseph Sachs
By *(signature)*
Attorney Patented Jan. 27, 1925.

1,524,153

UNITED STATES PATENT OFFICE.

JOSEPH SACHS, OF HARTFORD, CONNECTICUT.

METER PROTECTIVE DEVICE.

Application filed January 12, 1918. Serial No. 211,693. Renewed June 4, 1923.

*To all whom it may concern:*

Be it known that I, JOSEPH SACHS, a citizen of the United States, residing at Hartford, in the county of Hartford and State of Connecticut, have invented certain new and useful Improvements in Meter Protective Devices, of which the following a specification.

This invention relates to meter protective devices and is of particular utility in connection with the so-called meter adapters which serve for the protective corelation of an electric meter with an electric appliance or circuit containing casing or cabinet. Heretofore in order to permit of properly placing the adapter and securing it in protective relation between the cabinet and the meter, it has been customary to provide both the cabinet and the adapter with special fittings. By my invention I provide for the attachment of a meter adapter to any ordinary electric cabinet casing or appliance receiving or containing housing that is provided with the ordinary holes, apertures or knock-outs usually found in such cabinet for their connection to conduits or pipes containing the incoming and outgoing wires; when the cabinet is not provided with such holes, openings or knock-outs the adapter may be attached by merely drilling or otherwise cutting an ordinary round hole in one of the casing walls. While the invention is particularly directed to this, other matters are also concerned as hereinafter appears.

In the drawings accompanying and forming part of the present specification I have shown in detail an embodiment of the invention which will be set forth fully in the following description. I do not restrict myself to this particular showing; I may depart therefrom in several respects within the scope of the invention defined by the claims following said description.

Referring to said drawings:

Figure 1 is a face view of a meter installation showing the upper part of the appliance containing cabinet or casing, the meter and the coacting adapter, the latter and a part of the casing being broken away and in section.

Fig. 2 is a sectional side elevation of the same.

Fig. 3 is a transverse section on the line 3—3 of Fig. 1, looking in the direction of the arrows.

Fig. 4 is an enlarged detail view in section showing a form of coupler whereby my improved adapter may be connected to the cabinet or casing, the dotted lines showing the position of the coupler when it is desired to remove the adapter from the casing.

Fig. 5 is a perspective view of the adapter as it appears from the interior.

Like characters refer to like parts throughout the several views.

In order that my invention may be more completely comprehended, it must be understood that where meter protecting adapters are used in the manner and for the purpose above indicated, it is necessary at times to remove said adapter from its placement in protective relation between the meter and the main cabinet or housing. This must be accomplished in a simple and expeditious manner. Heretofore one way of associating the parts to permit of such disassociation has been to provide a slideway on the cabinet and a coacting and cooperating slide on the adapter which may be interlocked with the slideway in the cabinet to hold the adapter in place. Due to the position of the parts, such adapters can best be removed by withdrawing them outwardly at right angles to the surface on which the meter and other parts are mounted. It is also important that when the main casing is sealed and the adapter in place, the latter will be locked against removal and will not require additional sealing.

The particular form of adapter so far as concerns its shape or design to relate it properly with any particular meter or for that matter the meter associated end thereof is not always a vital part of my present invention, as this invention is particularly concerned with that part of the adapter connectible or associated with the appliance containing casing or housing. An adapter such as meets my conditions is such a one as that denoted in a general way by 2 and shown separated from everything else in Fig. 5. In Figs. 1 and 2 I have also shown an electric appliance receiving casing or housing as 3, and an electric meter as 4. These are merely types. Referring now especially to Fig. 5, the particular form of adapter there shown is one such as would be used for protective relation with what are known as top or bottom connected terminal chamber style of meter, of which that denoted by 4 is an example. The adapter may be constructed of sheet metal such as steel, having opposite sides 5 and 6, a front 7, a meter associated portion 8 and a main cabinet or casing associated portion 9. The meter associated portion 8 is provided with a cut which receives the terminal chamber of the meter, so that when the installation is made the said terminal chamber will project into the adapter and thus have the wires and connection parts of said terminal chamber protected. It may be remarked at this point that where other types of meters such as for instance the side connected meter are to be protectively related with the adapter its conformation must be of such shape as to provide proper protective relation with these otherwise disposed parts of the meter. The adapter at its portion 9 has a slot or cut 10 which roughly speaking is of U-form, but this is a detail. It is, however, a desirable thing that the sides of the slot or opening be substantially parallel and of a definite dimension to properly fit the locker or coupling means used for the purpose of coupling and locking the adapter to the main cabinet. In each of the sides of the cut or opening 10 and suitably placed therein are the prongs or projections 11 and 12 which in the construction shown are bent up out of the metal of the adapter itself and thrown inwardly. These prongs should be practically opposite each other.

The main cabinet or casing 3 is provided at one of its walls with a hole 13. This hole should be so located in the cabinet that it registers substantially with the closed end of the slot 10 as indicated by the dotted line in Fig. 5 when the parts are assembled. In order now that the adapter may be secured to and held in proper relation to the main cabinet I use a suitable locker or coupler such as the sleeve 14 provided with the flange 15 at one end and having an external groove 16 at the other end. This flanged sleeve after its insertion through the hole 13 in the main cabinet or casing is fitted with a spiral spring 17, the lower coil of which is seated in the annular groove 16 and the upper coil of which bears against the inner surface of the wall 18 of the main cabinet 3, so that the tension of the spring exerted between the internal end of the sleeve and the wall 18 thus always drawing the flanged end 15 of the sleeve toward the outer surface of the wall 18 against which the end 9 of the adapter abuts. This sleeve 14 constitutes the bushing for the electrical conduction connecting the meter and the appliance in the casing as shown in the drawings.

With the casing 3 and the meter 1 mounted on the supporting surface in proper position relatively to each other and spaced so that the adapter may be put in place, the latter with its part 9 against the outer surface of the wall 18 of the casing and with the open end of the slot 10 registering with the opening 13, is now pushed towards the supporting surface on which the parts are mounted. When it has been pushed all the way so that the edges at the open end of the adapter abut against the surface within the closed end of the slot 10 will register with the hole 13 as indicated in Fig. 5 and also in Figs. 2 and 3. Before the adapter, however, can be pushed down in the manner described, it will first be necessary that the sleeve 14 be pushed so that the flanged head 15 thereof is separated from the outer surface of the wall 18 a sufficient distance to permit the prongs 11 and 12 to pass thereby and between the outer surface of the wall 18 and the inner surface of the flange 15. At this point it may be noted and will be obvious that these prongs 11 and 12 are of such suitable height as to permit of passing in between the space thus provided when the sleeve 14 is pushed out as above described. After the adapter is pushed all the way down, then the sleeve may be released, so that the flanged head thereof now moves back toward its original position, but instead of abutting against the outer surface of the wall 18 it is received against the inner surface of the portion 9 and in front of the projections or prongs 11 and 12 which are now disposed circumferentially around the flange 15 in the manner indicated in Fig. 3. In view of this relationship the adapter is not only held firmly against the wall 18 but is also locked against movement outwardly unless access can be had to the inside of the main cabinet 3 and the sleeve 14 pushes outwardly to permit of the prongs 11 and 12 passing by the flange 15. It will be understood that in the normal working condition of the parts the main cabinet or housing 3 will be sealed, a cover closing the open side of the housing as shown in Figs. 1 and 2, so that such access to the sleeve 4 cannot be had and consequently so long as such sealed relationship is obtained, the adapter 2 will be maintained and securely held in proper protective relation with the meter terminal chamber and also in connection with the main cabinet 3.

I have shown a coupler or locker which well meets the requirements, but as will be obvious there are many other forms which may be used for the purpose described. The principal consideration in such a coupler is that it should be capable of functioning in the manner stated. I also wish to make clear that the particular form of the slot or opening 10 and the disposition of the necessary projections or prongs or other parts for interlocking with the coupler is variable to any extent conforming with the necessities of design.

What I claim is:

1. A meter installation comprising an electric appliance receiving casing, a meter adapter, and a locker on the casing, for holding the adapter in assembled relation with the casing, the locker having wire-passage means.

2. A meter installation comprising an electric appliance receiving casing, a meter adapter, and a locker for holding the meter adapter in assembled relation with the casing and retractible to release the adapter, said locker being positioned at the opening in the casing through which the wires pass from the casing to the adapter.

3. A meter installation comprising an electric appliance receiving casing, a meter adapter, and means for holding the adapter in assembled relation with the casing and having an opening therethrough for the passage of an electric appliance.

4. A meter installation comprising an electric appliance receiving casing, a meter adapter, and a locker, for holding the adapter in assembled relation with the casing and having an opening for the passage of a wire.

5. A meter installation comprising an electric appliance receiving casing, a meter adapter, and a locker associated with the casing, for holding the adapter in assembled relation with said casing and yieldingly held in its active position.

6. A meter installation comprising an electric appliance receiving casing, a meter adapter, a locker for holding the adapter in assembled relation with the casing, and spring means acting against the locker to maintain the same yieldingly in active relation.

7. A meter installation comprising an electric appliance receiving casing, a meter adapter, and a hollow locker, provided with means associated therewith for yieldingly holding the adapter in assembled relation with the casing.

8. A meter installation comprising an electric appliance receiving casing, a meter adapter associated with the casing, a locker, means for releasably holding the locker in position to maintain the adapter in assembled relation with the casing, the adapter having a projection to abut against the locker, and the locker being retractive to carry it free of the projection to thus release the adapter.

9. A meter installation comprising an electric appliance receiving casing, a meter adapter in corelation with the casing, and means movable with respect to both the casing and the adapter, carried by one of the parts at the wire-passage opening thereof, for releasably maintaining the adapter in operative relation with the casing.

10. A meter installation comprising an electric appliance receiving casing, a meter adapter in corelation with the casing, and means movable with respect to both the casing and the adapter, carried by one of the parts for releasably maintaining the adapter in operative relation with the casing, said means having in turn wire-passage means and being accessible by way of the casing to move the same to releasing position and thus effect the freeing of the adapter.

11. A meter installation comprising an electric appliance receiving casing, a meter adapter in corelation therewith, and locking means for holding the adapter in assembled relation with the casing and having an opening for the passage of a part from the casing to the adapter.

12. A meter installation comprising an electric appliance receiving casing, a meter adapter to cooperate with the casing, and yieldable locking means for holding the adapter in assembled relation with the casing, the locking means being accessible by way of the casing to move the same to releasing position to free the adapter.

13. A meter installation comprising an electric appliance receiving casing, a meter adapter, and locking means for holding the adapter in assembled relation and movable to adapter-releasing position in a direction away from the casing, said locking means having means to permit the passage of a wire from the casing to the adapter.

14. A meter installation comprising an electric appliance receiving casing, a meter adapter, and locking means carried by one of the parts for holding the adapter in assembled relation and movable in a direction away from the part which carries it to free the adapter, said locking means having means to permit the passage of a wire from the casing to the adapter.

15. An electric appliance receiving casing having an opening through one of its walls, a locker associatable with said opening, a meter adapter provided with an opening in one of its walls to receive said locker, said adapter having a projection at its opening to abut against the locker, and the locker being provided with means whereby it may be locked to hold the adapter in secured relation to the casing or may be moved to releasing position for thus permitting the detachment of the adapter from the casing.

16. An electric appliance receiving casing having a wire-passage opening, a locker associated with the casing at said opening, a meter adapter having an opening in one of its walls to receive said locker, means on the adapter and cooperative with the locker when in one of its positions to effect the locked association of the adapter with the casing, and means on the locker to permit of its being positioned to release the locked relation between it and the adapter for thus permitting the removal of the adapter from the casing.

17. An electric appliance receiving casing having an opening in a wall thereof, a bushing in said opening, said bushing being provided with a flanged locking portion and also with means to permit its being positioned in locking or releasing relation, a meter adapter having a slot in one of its walls, and also having a projection on the slotted part, said slot receiving the body of the locker for thus permitting the movement of the adapter in operative position on the casing when the bushing is in the releasing relation and to hold the adapter in locked relation with the casing when the bushing is in the locked relation.

18. An electric appliance receiving casing, a meter adapter associated therewith, and a locker to hold the parts in corelation with each other and having a wireway.

19. In a meter installation an electric appliance receiving casing, a meter adapter, and a locker, the meter installation having means to permit of the movement of the adapter in one direction to release the same, and in the reverse direction to operatively position it in relation to the casing, and also with means movable in a direction transverse to the first mentioned direction of the other movements to thereby effect a locked or releasing relationship of the parts comprising the aforesaid meter installation, said locker having means to permit the passage of a wire from the casing to the adapter.

20. A meter adapter having a wire-passage opening to receive a locker and also having a projection to abut against the locker, the locker when in place permitting the passage of a wire through the opening.

21. A meter adapter having an open-ended wire-passage opening to receive a locker and also having a projection to cooperate with the locker, the locker when in place permitting the passage of the wire through the opening.

22. A meter adapter having a wire-passage opening in one of its walls, and a projection on the aforesaid wall for thus permitting the association of said adapter with a locker and for holding said adapter in locked relation therewith when the locker is in one of its positions, the locker when in place permitting the passage of the wire through the opening.

23. An electric appliance receiving casing having a knock out, a meter adapter, and tubular locking means for holding the meter adapter to the casing and fitting the knock out opening.

24. An electric appliance receiving casing having a knock out, a meter adapter having an opening to cooperate with the knock out opening, and locking means at the cooperating openings in the casing and adapter for holding them in assembled relation, said locking means permitting the passage of wires through said openings.

25. A meter installation comprising an electric appliance receiving casing, a meter, a meter adapter joining said casing and meter, an means for holding the adapter in assembled relation with the casing having an opening therethrough for the passage of the conductors connecting the meter and the appliance in the casing.

26. A meter installation comprising an appliance receiving casing having an opening in one wall, a meter adjacent said opening, an adapter completing the enclosure of the appliance and the electrical conductors connecting the appliance and the meter, and a sleeve yieldingly mounted in said opening to releasably lock the adapter to the casing, said sleeve being enclosed by the adapter and casing and constituting a bushing for leading said conductors through the casing wall.

27. A meter installation comprising a meter, means comprising a casing and an adapter to enclose an electric appliance and the connections from said meter to said appliance, and an elastic locking means to hold the casing and adapter together, said locking means being releasable at all times but being contained within the first mentioned means so as to be out of reach while said first mentioned means is closed.

28. A meter installation comprising an appliance receiving casing, a meter correlated therewith, an adapter completing the enclosure of the connections extending from within the casing to the meter, and elastic locking means to hold the casing and adapter together, said elastic locking means being accessible only from within the casing for release thereof, and the casing having a removable cover preventing access to said locking means when the cover is in closed position.

29. A meter installation comprising a meter, means correlated therewith and constituted of two parts, one of which is an appliance receiving casing and the other of which is an adapter member completing the enclosure of connections extending from within the casing to the meter, said adapter being applied at one side of said casing by movement crosswise of the casing, and a locking device projecting from one of said two parts into the space occupied by the other of said parts for locking engagement with a complementary locking device on said other part, said locking devices being accessible for release only from within said means, and one of the parts of said means being provided with a cover which, when open, permits access to one of the locking devices to secure the release thereof.

30. A meter installation comprising a meter, means correlated therewith and constituted of two parts, one of which is an appliance receiving casing and the other of which is an adapter member completing the enclosure of connections extending from within the casing to the meter, said adapter being applied at one side of said casing by movement crosswise of the casing, and a locking device projecting from one of said two parts into the space occupied by the other of said parts for locking engagement with a complementary locking device on said other part, said other part being provided with a pathway for said projecting locking device permitting application of the adapter by crosswise movement as aforesaid, and said locking devices being accessible for release only from within said means, and one of the parts of said means being provided with a cover which, when open, permits access to one of the locking devices to secure the release thereof.

31. A meter installation comprising a meter, an appliance receiving casing, an adapter member completing the enclosure of connections reaching from within the casing to the meter, and a locking device projecting from one side of the casing into the path of the adapter for engagement therewith to hold the adapter and casing assembled together, the adapter member being provided with a slot correlated with the locking device to permit the application of the adapter member by movement crosswise of the casing, and said locking device being concealed and accessible for release only from within the casing and said casing having a cover which, when closed, places said locking device out of reach.

32. A meter installation omprising a meter, an appliance receiving casing, an adapter member completing the enclosure of connections reaching from within the casing to the meter, and a spring-held locking device projecting from one side of the casing into the path of the adapter for engagement therewith to hold the adapter and casing assembled together, the adapter member being provided with a slot correlated with the locking device to permit the application of the adapter member by movement crosswise of the casing, and said locking device being concealed and accessible for release only from within the casing and said casing having a cover which, when closed, places said locking device out of reach.

33. A meter installation comprising a meter, a correlated means constituted of two parts, one of which is an appliance receiving casing and the other of which is an adapter completing the enclosure of the connections extending from within the casing to the meter, and a spring-pressed locking device contained within said means and projecting through a hole in one of said parts into locking engagement with the other of said parts, and one of said parts being provided with a cover permitting access to said locking device.

34. A meter installation comprising a meter, an appliance receiving casing correlated therewith and having a knock-out hole in one of its walls, an adapter completing the enclosure of connections extending from within said casing to the meter and covering said knock-out hole, and a locking member within the casing arranged to act through the said hole to engage said adapter, the casing being provided with a cover preventing and permitting access to the interior of the casing and thereby controlling the release of said locking member.

35. A meter installation comprising an appliance receiving casing, a meter adjacent one wall of said casing, said wall of the casing being provided with a knockout hole, an adapter covering said knockout hole and completing the enclosure of the connections extending from within the casing to the meter, said adapter having an open-ended slot in a wall thereof registering with said knockout hole, and a spring-pressed locking member extending through the said hole to engage with the wall of said slot to hold the adapter to the casing, said open-ended slot permitting the adapter to pass said locking member and be applied to the casing by movement cross-wise of the casing.

In testimony whereof I affix my signature in the presence of two witnesses.

JOSEPH SACHS.

Witnesses:
L. L. MARKEL,
HEATH SUTHERLAND.